United States Patent
Dietl et al.

(10) Patent No.: US 7,318,419 B2
(45) Date of Patent: Jan. 15, 2008

(54) METHOD FOR DETERMINING THE ACTUATOR ENERGY REQUIRED FOR THE DIFFERENT INJECTION TYPES OF AN ACTUATOR OF AN INTERNAL COMBUSTION ENGINE

(75) Inventors: Roland Dietl, Straubing (DE); Hans-Peter Rabl, Kelheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/561,054

(22) PCT Filed: Dec. 20, 2004

(86) PCT No.: PCT/EP2004/053615

§ 371 (c)(1),
(2), (4) Date: Aug. 9, 2006

(87) PCT Pub. No.: WO2005/080778

PCT Pub. Date: Sep. 1, 2005

(65) Prior Publication Data

US 2007/0068484 A1 Mar. 29, 2007

(30) Foreign Application Priority Data

Feb. 10, 2004 (DE) .................. 10 2004 006 558

(51) Int. Cl.
*F02M 51/00* (2006.01)
*F02M 1/00* (2006.01)

(52) U.S. Cl. .................. 123/478; 123/480

(58) Field of Classification Search .......... 123/299, 123/300, 304, 305, 478, 480, 490, 494, 500, 123/501

See application file for complete search history.

(56) References Cited

U.S. PATENT DOCUMENTS

| | | | |
|---|---|---|---|
| 5,862,791 A * | 1/1999 | Schoenfelder et al. | 123/357 |
| 6,311,669 B1 | 11/2001 | Przymusinski et al. | 123/300 |
| 6,491,027 B1 | 12/2002 | Freudenberg et al. | 123/490 |
| 6,622,692 B2 | 9/2003 | Yomogida | 123/299 |
| 2003/0066516 A1 | 4/2003 | Liskow | 123/490 |
| 2003/0200957 A1 * | 10/2003 | Shinogle | 123/480 |
| 2004/0040366 A1 * | 3/2004 | Matsubara et al. | 73/1.06 |
| 2004/0099054 A1 * | 5/2004 | Shingole | 73/119 A |

FOREIGN PATENT DOCUMENTS

| | | |
|---|---|---|
| DE | 19712143 | 3/1997 |
| DE | 10011630 | 9/2001 |
| EP | 1 318 288 A2 | 6/2003 |
| EP | 1 344 923 A2 | 9/2003 |
| JP | 4 153530 A | 5/1992 |
| JP | 10 205383 | 11/1998 |
| WO | 03081007 | 10/2003 |
| WO | 2005080778 | 9/2005 |

* cited by examiner

*Primary Examiner*—John T. Kwon
(74) *Attorney, Agent, or Firm*—Baker Botts L.L.P.

(57) ABSTRACT

In a method for determining the actuator energy required for the different injection types of an actuator of an internal combustion engine, the actuator is impinged by a control signal in such a way that an actuator signal is generated and an injection parameter of the internal combustion engine is set in such a way that said actuator signal is generated at a specific stored time. The first injection type in the combustion cycle is first deactivated in order to determine the actuator energy of said type from the second injection type.

19 Claims, 2 Drawing Sheets

METHOD FOR DETERMINING THE ACTUATOR ENERGY REQUIRED FOR THE DIFFERENT INJECTION TYPES OF AN ACTUATOR OF AN INTERNAL COMBUSTION ENGINE

CROSS-REFERENCE TO RELATED APPLICATIONS

This application is a U.S. national stage application of International Application No. PCT/EP2004/053615 filed Dec. 20, 2004, which designates the United States of America, and claims priority to German application number DE 10 2004 006 558.6 filed Feb. 10, 2004, the contents of which are hereby incorporated by reference in their entirety.

TECHNICAL FIELD

The invention relates to a method for determining the actuator energy required for the different injection types of an actuator of an internal combustion engine.

BACKGROUND

Such a method is intended to enable differences in the injection quantity between the cylinders to be detected and adjusted if necessary. It is precisely in order to achieve small injection quantities, particularly of advance injection quantities in the region of a few milligrams, that determining the actuator energy is crucial for complying with exhaust emissions. When injectors are equalized by means of the actuator signal, stationary operating points lasting several seconds (3 to 4 seconds) must be observed, depending on the injection pressure, to enable the actuator energy of the main injection to be determined. During active control, the time between the triggering of the injector and the actuator signal of all injectors is set to a value stored in the engine characteristics map. Since fairly large injection quantities are required for reliable evaluation of an actuator signal, only the main injection may be included in order to determine the actuator energy. This energy for the main injection is used as the basis for the energy for the advance injection and after-injection.

However, it has been found that the advance injection generates local variations in pressure in the incoming injector line. These local variations in pressure cannot be detected by the pressure gage in the rail, so that the pressure appears constant to the control system. These local pressure variations have a significant effect on the opening behavior of the injector and thus on all subsequent injections. The actuator signal of the main injection therefore displays a clear dependence on the separation angle between the advance injection and after-injection. If the main injection is effected with "maximum pressure", for example, the needle of this injector will be opened more quickly because of the locally higher pressure. As a result, the actuator signal is generated at an earlier point in time. This causes the control system to reduce the actuator energy for the corresponding injector in order to set the time between the start of the control and the generation of the actuator signal to the value set in the engine characteristics map. Even if the energy setting for the main injection is correct, the advance injection depending on it still receives too little energy.

SUMMARY

The object of the invention is therefore to present a method that enables the actuator energy for advance injection and after-injection to be reliably determined.

The object of the invention can be achieved by a method for determining the actuator energy required for different injection types of an actuator of an internal combustion engine, the method comprising the steps of applying a control signal to the actuator such that the control signal generates an actuator signal; and setting an injection parameter of the internal combustion engine such that the actuator signal is generated at a specific stored time, wherein a first injection type in a combustion cycle is deactivated in order to determine an actuator energy of the type from a second injection type.

The first injection type can be reactivated in order to determine an actuator energy required for the second injection type. A last injection type can be an advance injection and the second injection type can be a main injection. The internal combustion engine can be in a stationary operating state. An injection pressure of the injectors can be changed after each control process. The main injection can be changed in order to generate the actuator signal. The control signal can be applied to one injector at a first point in time, and the actuator signal can be generated at a second point in time after a specific time. In an internal combustion engine with several injectors, the difference in two points in time of one injector can be the same as the respective difference between two points in time of another injector. At least one of the following variables can be selected as an injection parameter: loading time of the control signal, amplitude of the control signal, control duration and actuator energy.

In the inventive method for determining the actuator energy required for the different injection types of an actuator of an internal combustion engine, a control signal is applied to the actuator such that said control signal generates an actuator signal, and an injection parameter of the internal combustion engine is set such that said actuator signal is generated at a specific stored time. The first injection type in the combustion cycle is first deactivated in order to determine the actuator energy of said type from the second injection type. This is particularly advantageous since the local pressure variations generated by the first injection type are eliminated. A number of injections are carried out in the combustion cycle of an internal combustion engine, particularly in common rail diesel engines. In order to reduce exhaust emissions and noise emissions, an advance injection is first carried out which triggers the combustion by a small injection quantity. The remaining diesel quantity is then added to the process during the main injection.

It has been found to be particularly advantageous for the first injection type to be reactivated after its actuator energy has been specified. The actuator energy necessary for the second injection type can then be specified. The local pressure variations triggered by the first injection type cause the needles of the different injectors to open at different speeds and therefore to require different amounts of actuator energy.

It has been found to be highly advantageous for the control signal at the first point in time (start of injection) to be applied to one injector and for the actuator signal then to be generated after a certain time at a second point in time. Thus in an internal combustion engine with several injectors, the difference between the two points in time (start of injection and actuator signal) for one injector is the same as the corresponding difference in the two points in time for a different injector. These measures enable all injectors to be equalized, i.e. for the injectors to inject the same quantity of fuel for each injection type.

Other advantageous embodiments of the invention are specified in the remaining dependent claims.

BRIEF DESCRIPTION OF THE DRAWINGS

The invention is explained below by way of example with reference to the schematic diagrams, in which.

DETAILED DESCRIPTION

Figure 1:
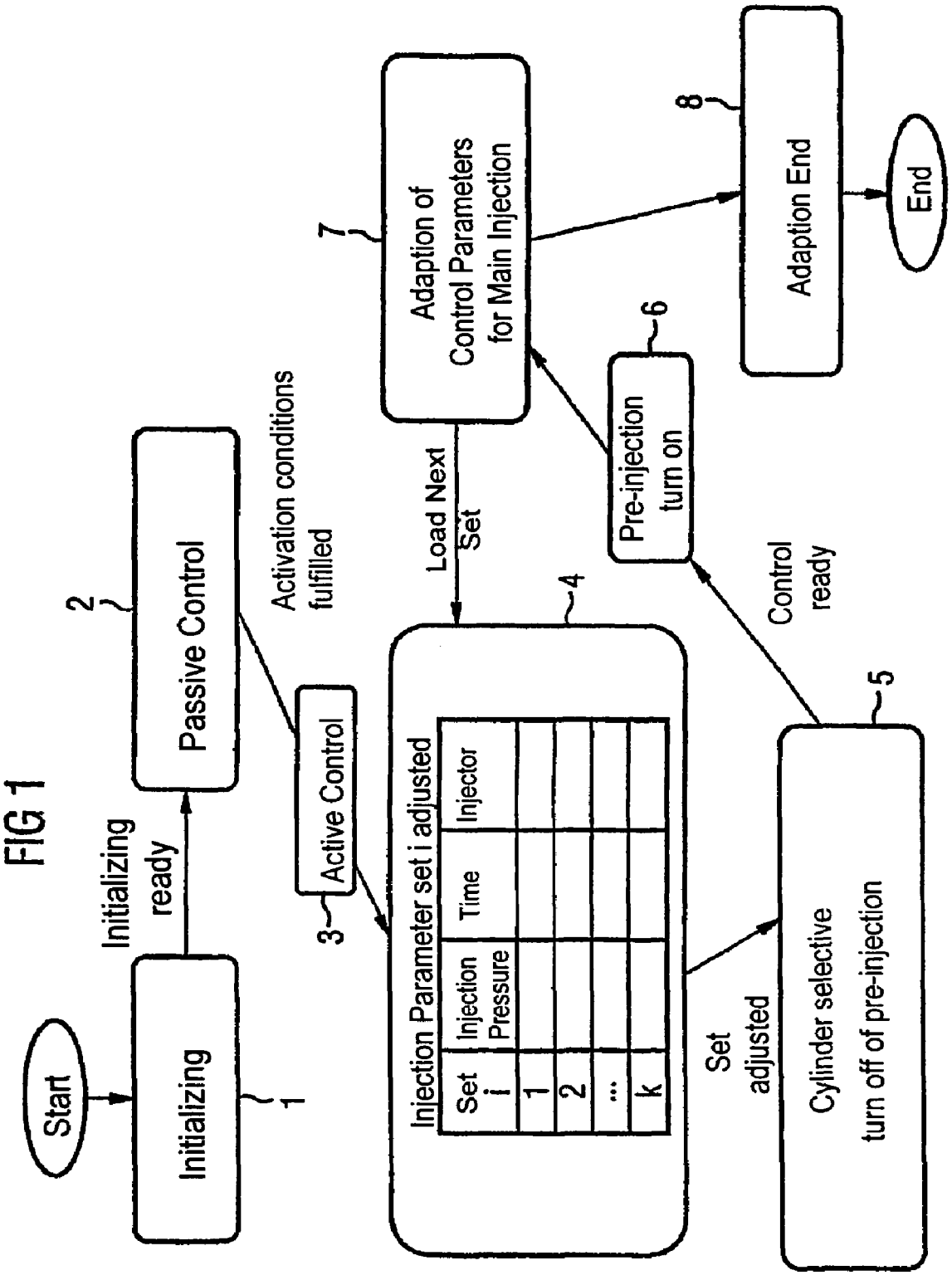
FIG. 1 is a flow chart showing the respective actuator energy levels in the individual injection types.

During the start, in stage 1 the function is initialized in the control device of the internal combustion engine. Stored adjustment values are loaded at this stage. After the initialization has been completed, in stage 2 the system waits until the preferred operating conditions are reached. For further control it is necessary for the internal combustion engine to be at a stationary operating point. This means, for example, that the load, the engine speed and the cooling water temperature are constant. Once the activation conditions are met, the control is activated in stage 3. In stage 4, the injection parameters i are set. These include the corresponding injection pressure and the corresponding injection time of a corresponding injector. Once the record is set, in stage 5 the advance injection is initiated for selected cylinders, whereby the control energy of the main injection is changed so as to eliminate the manufacturing tolerances in the injectors. The actuator energy required for the advance injection is determined for the respective injector. After this control, the advance injection is identical for each injector. This description will now concentrate on FIG. 2 in further detail. After this control, in stage 6 the advance injection is reactivated to enable the control energy to be determined for the main injection (stage 7). The control parameters are stored for the relevant injection parameters as record i. If the actuator energy levels or the control parameters have been determined for the different operating points of the internal combustion engine, then the adjustment is completed in stage 8.

Figure 2A:
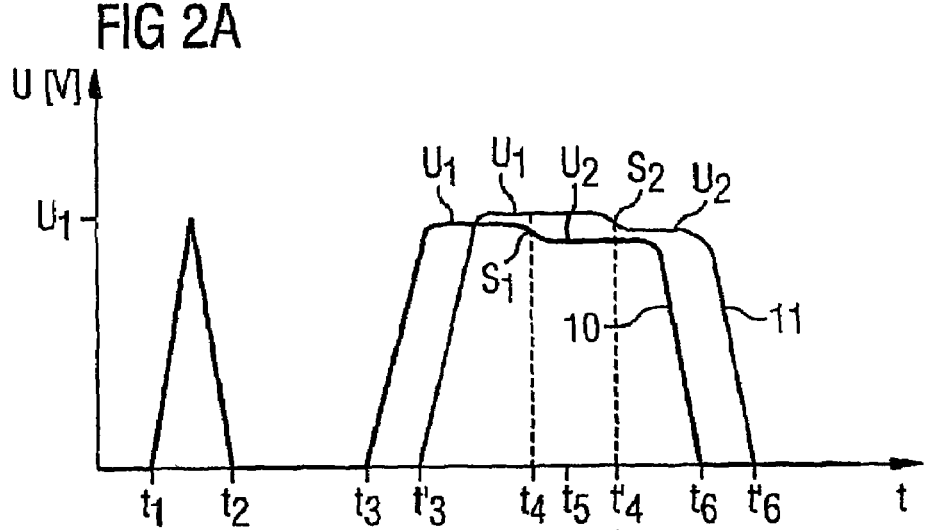
FIG. 2A shows the chronological sequence of the control signal.
Figure 2B:
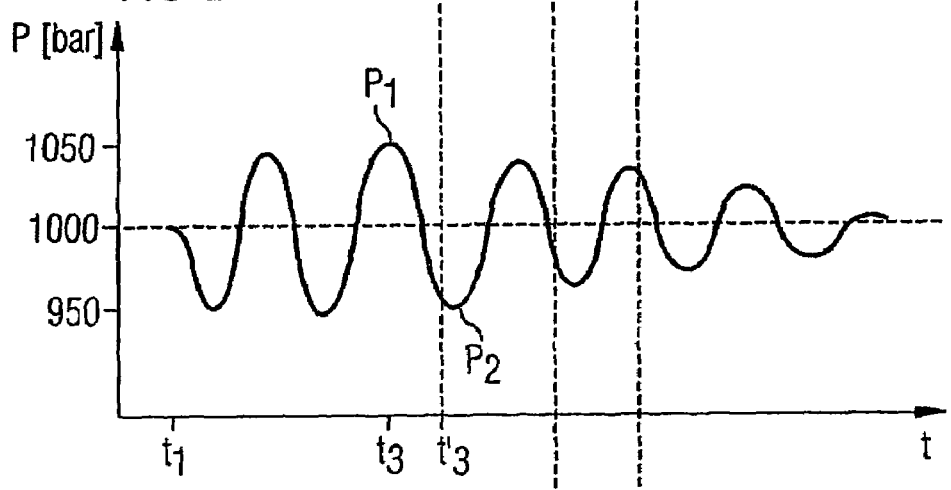
FIG. 2B shows the chronological sequence of the local pressure variation in the incoming injector line.
Figure 2C:
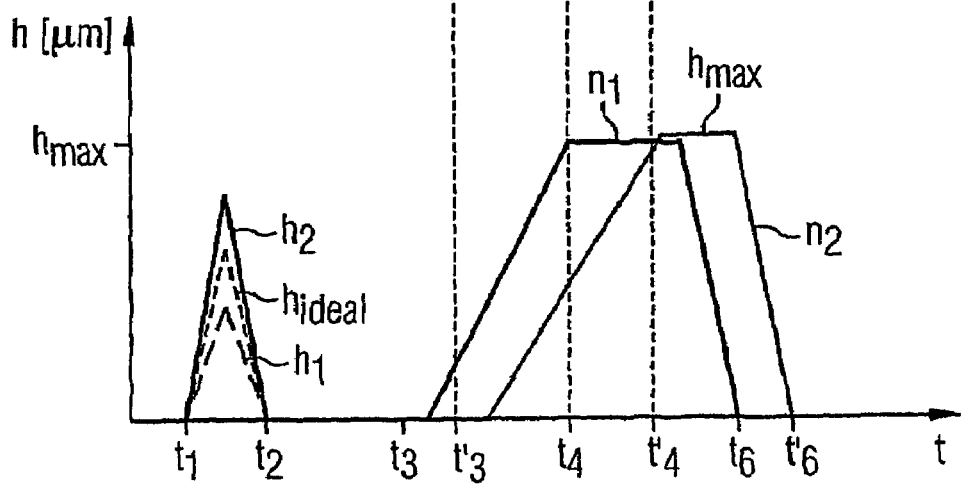
FIG. 2C shows the chronological sequence of the needle stroke.

FIG. 2 shows, on the basis of an injector, the processes with regard to errors that may occur in the event of local pressure variations. The time axes in FIGS. 2A to 2C are identical.

FIG. 2A shows the control signal of the actuators. A first control signal, which triggers an advance injection, is applied between the points in time $t_1$, $t_2$. From time $t_3$ to time $t_6$, a second control signal is applied to the actuator. This control signal triggers the main injection. Alternatively, a further control signal, which has a greater separation angle than the second control signal, may be applied from $t'_3$ to $t'_6$. The separation angle between advance injection and main injection is formed by the time difference between $t_3$ (or $t'_3$) and $t_2$. For greater clarity the two control signals of the main injection have been mapped one over the other. The two main injections have the same amplitude, however. As already mentioned above, the advance injection generates a local pressure variation, which is shown in FIG. 2B. At the start of the advance injection, the local pressure is temporarily reduced at time $t_1$.

The two extreme cases are described below.

Case 1: The control of the main injection 10 starts at time $t_3$. As may be seen in FIG. 2B, in this case a maximum pressure $p_1$ (of approx. 1050 bar) is applied. This increased pressure causes the needle of the injector to open more quickly. The corresponding needle elevation signal is shown in FIG. 2C as curve $n_1$. After a brief hydraulic delay, the needle starts to rise. At time $t_4$ the needle has reached its maximum elevation $h_{max}$. The voltage $U_1$ of the control signal 10 then falls to the voltage $U_2$. This actuator signal $S_1$ is generated too early, and the control system interprets this as a manufacturing tolerance. This means that this injector needs less energy to lift the needle than is actually required. Because of this control, the advance injection receives a control signal that generates the insufficient needle elevation $h_1$ (see FIG. 2C).

Case 2: The control of the main injection 11 starts at time $t'_3$. At this point in time, a local minimum pressure of $p_2$ (approx. 950 bar) is applied. In this case the needle of the injector opens more slowly than in the above example. This may be seen in FIG. 2C, since the gradient in the needle elevation $n_2$ is flatter than that of $n_1$. After a brief hydraulic delay, the needle is opened to its maximum extent at $t'_4$. The actuator signal $S_2$ is generated at this time $t'_2$. Since the difference between the time $t'_4$ and $t_3$ is greater than the difference between $t_4$ and $t_3$, the control system interprets that this injector requires more energy to lift the needle. Because of this control, a control signal is generated for the advance injection, causing the needle elevation $h_2$. This injector does not, however, require a needle elevation of $h_1$ or $h_2$, but an ideal needle elevation of $h_{ideal}$, as shown in FIG. 2C. The ideal control signal for the advance injection is thus determined, whereby the control signal for the advance injection is deactivated so that no local pressure variations are generated. In this example, the "normal" pressure is 1000 bar.

FIG. 2 shows the strong dependency of the separation angle between advance injection and main injection, that can be avoided with the inventive method. The method for separately determining the actuator energy for the advance injection and main injection enables injection quantity variations, which are caused by local pressure variations in the system, to be almost completely compensated for.

The invention claimed is:

1. A method for determining the actuator energy required for different injection types of an actuator of an internal combustion engine, the method comprising the steps of:

applying a control signal to the actuator such that said control signal generates an actuator signal;

setting an injection parameter of the internal combustion engine such that said actuator signal is generated at a specific stored time, wherein a first injection in a combustion cycle is deactivated in order to determine an actuator energy required for said first injection from a second injection in said combustion cycle.

2. A method according to claim 1, wherein the first injection is reactivated in order to determine an actuator energy required for the second injection.

3. A method according to claim 2, wherein the first injection is a pre-injection and the second injection is a main injection.

4. A method according to claim 1, wherein the internal combustion engine is in a stationary operating state.

5. A method according to claim 1, wherein an injection pressure of the injectors is changed after each control process.

6. A method according to claim 2, wherein the main injection is changed in order to generate the actuator signal.

7. A method according to claim 1, wherein the control signal is applied to one injector at a first point in time, and the actuator signal is generated at a second point in time after a specific time.

8. A method according to claim 1, wherein, in an internal combustion engine with several injectors, the difference in two points in time of one injector is the same as the respective difference between two points in time of another injector.

9. A method according to claim 1, wherein at least one of the following variables is selected as an injection parameter: loading time of the control signal, amplitude of the control signal, control duration and actuator energy.

10. A system for determining the actuator energy required for different injection types of an actuator of an internal combustion engine, comprising:
means for applying a control signal to the actuator such that said control signal generates an actuator signal; and
means for setting an injection parameter of the internal combustion engine such that said actuator signal is generated at a specific stored time, wherein a first injection in a combustion cycle is deactivated in order to determine an actuator energy required for said first injection from a second injection in said combustion cycle.

11. A system according to claim 10, wherein the first injection is reactivated in order to determine an actuator energy required for the second injection.

12. A system according to claim 11, wherein the first injection is a pre-injection and the second injection is a main injection.

13. A system according to claim 10, wherein the internal combustion engine is in a stationary operating state.

14. A system according to claim 10, wherein an injection pressure of the injectors is changed after each control process.

15. A system according to claim 12, wherein the main injection is changed in order to generate the actuator signal.

16. A system according to claim 10, wherein the control signal is applied to one injector at a first point in time, and the actuator signal is generated at a second point in time after a specific time.

17. A system according to claim 10, wherein, the internal combustion engine comprises several injectors, and wherein the difference in two points in time of one injector is the same as the respective difference between two points in time of another injector.

18. A system according to claim 10, wherein at least one of the following variables is selected as an injection parameter: loading time of the control signal, amplitude of the control signal, control duration and actuator energy.

19. A method for determining the actuator energy required for different injections of an actuator of an internal combustion engine, the method comprising the steps of:
applying a control signal to the actuator such that said control signal generates an actuator signal;
setting an injection parameter of the internal combustion engine such that said actuator signal is generated at a specific stored time, wherein a pre-injection in a combustion cycle is deactivated in order to determine an actuator energy for said pre-injection from a following main injection in said combustion cycle.

* * * * *